July 4, 1939.  A. PODMORE  2,164,423
MANUFACTURE OF CIGARETTES
Filed Dec. 4, 1935   5 Sheets-Sheet 2

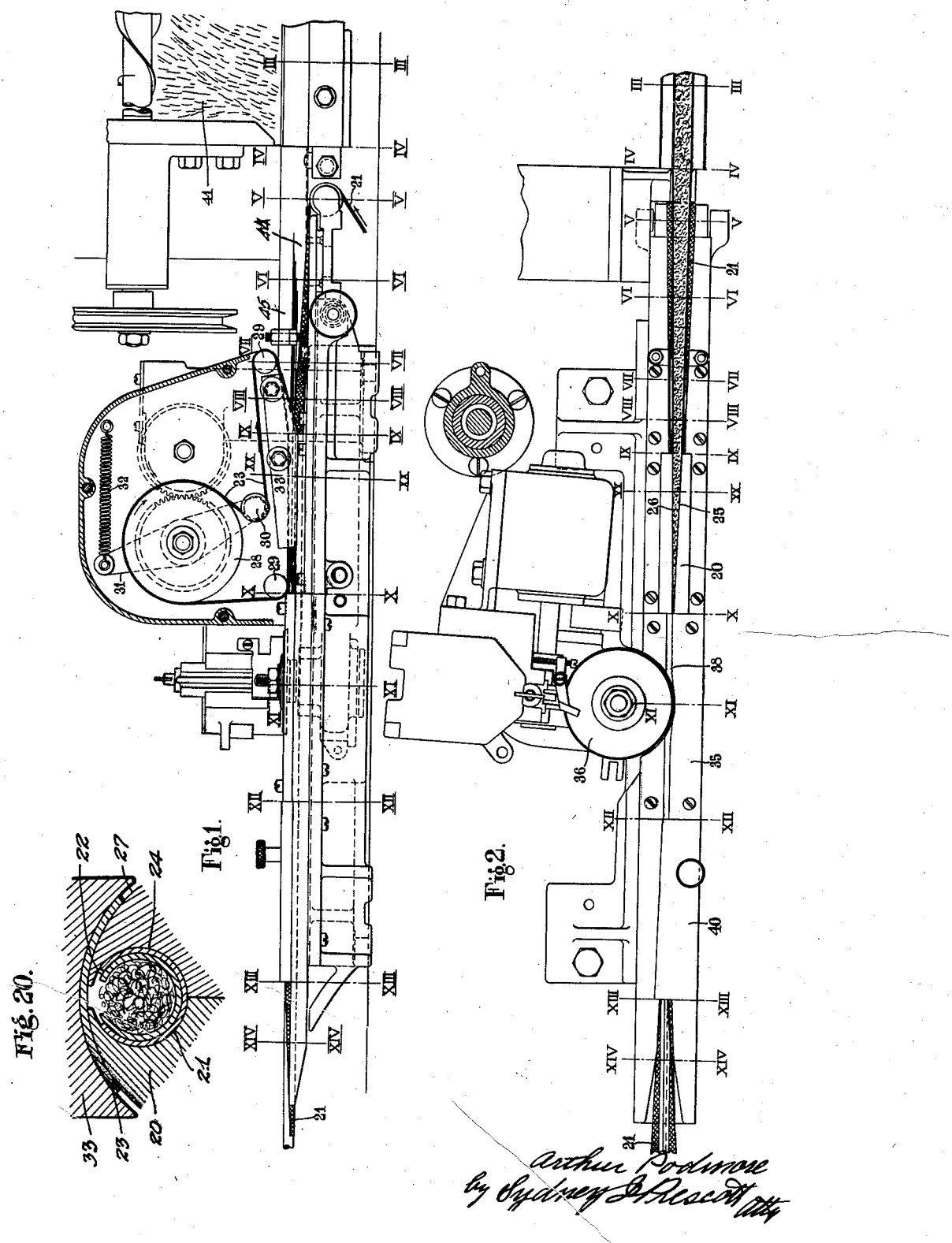

Arthur Podmore
by Sydney Prescott Atty

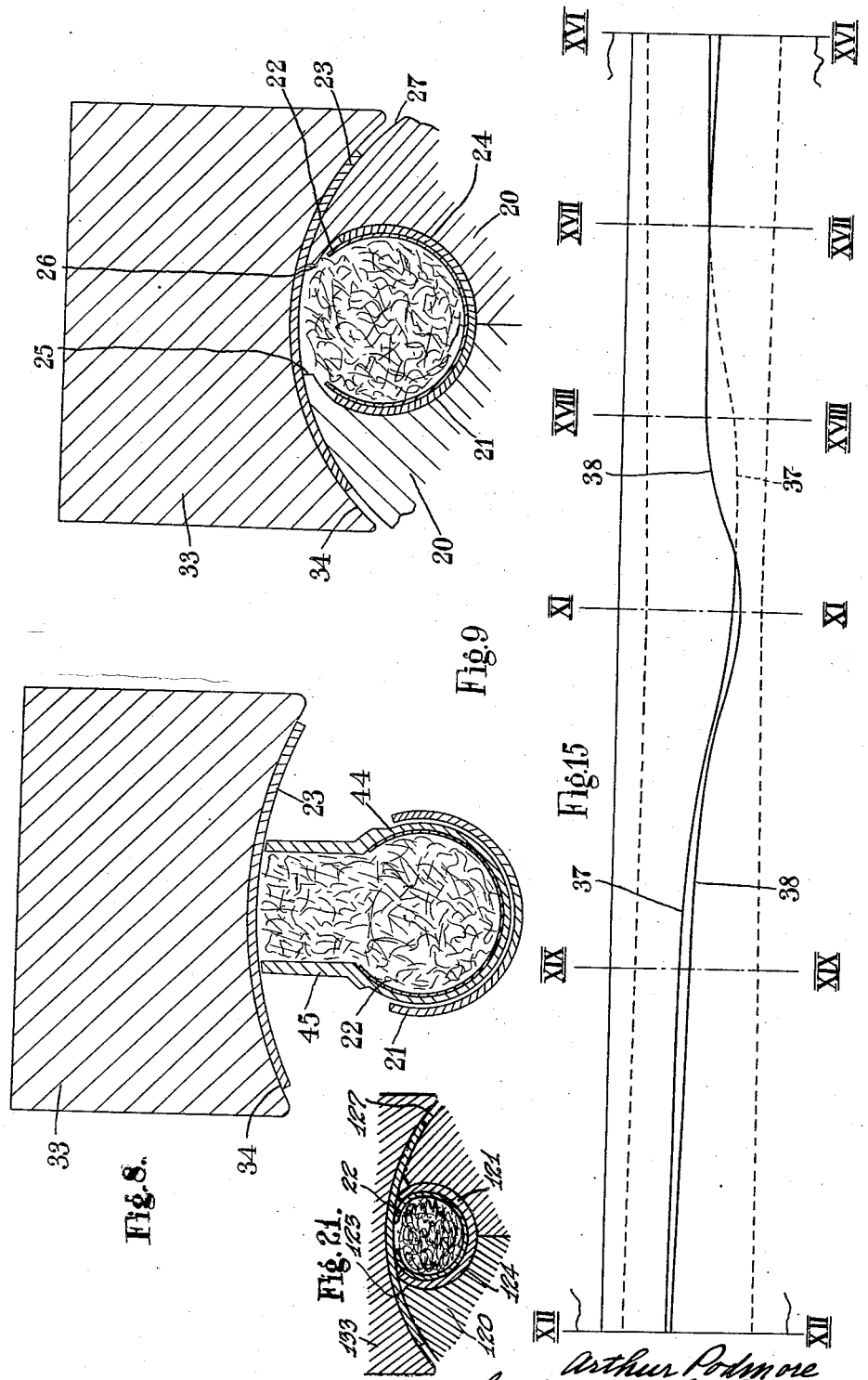

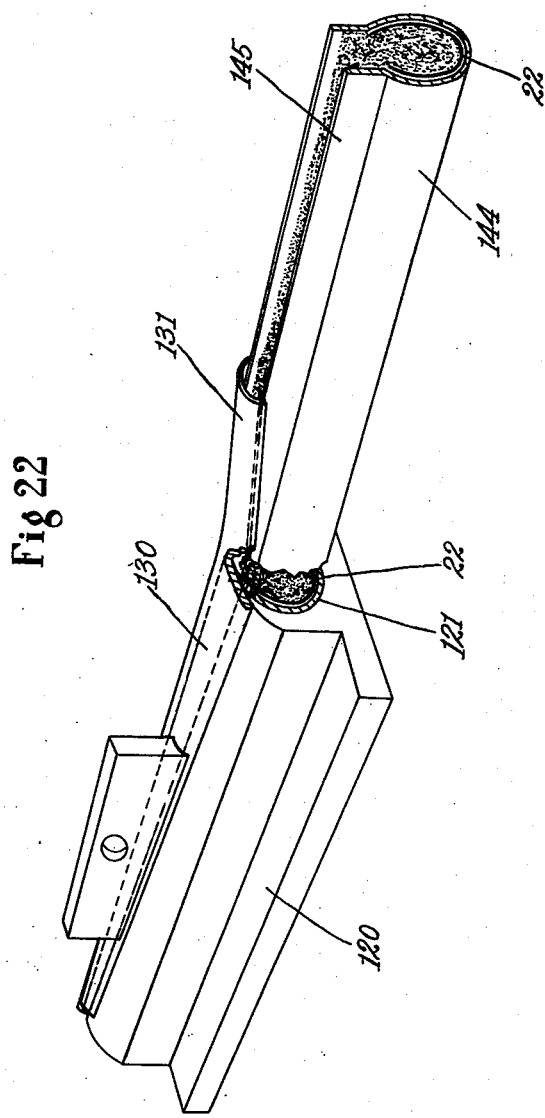

Patented July 4, 1939

2,164,423

UNITED STATES PATENT OFFICE

2,164,423

MANUFACTURE OF CIGARETTES

Arthur Podmore, London, England, assignor to American Machine & Foundry Company, New York, N. Y., a corporation of New Jersey Application December 4, 1935, Serial No. 52,747
In Great Britain December 6, 1934

10 Claims. (Cl. 131—43)

This invention relates to the manufacture of cigarettes by the continuous cigarette rod method and more particularly to the step of the formation of the rod in which the filler of tobacco is enfolded or wrapped in the paper web or wrapper.

It will be appreciated that the cross sectional dimension of the tobacco filler prior to wrapping is considerably greater than the cross sectional dimension of the finished rod or cigarette. In the wrapping step it is therefore necessary to compress the filler until the dimension is such that the edges of the web or wrapper may overlap and be sealed.

It has hitherto been the practice to effect the compression or the final compressing stage by passing the filler through a conduit of tapered form, the ultimate section of which corresponds, or nearly so, to the finished rod. The filler during its passage through the compression conduit is supported by the paper web which in turn is supported by a conveyor band. Diametrically opposed to the conveyor band however the filler is in direct contact with the compression conduit which is formed by a tapered cone. Thus the filler at the upper portion contacts with a stationary surface whereby considerable friction is set up resulting in a brake upon the travelling filler which produces unevenness in the wrapped rod at times even producing definite breaks in the filler. This unevenness may be caused at the entrance to the conduit, or at the point of egress, i. e. where the filler is subjected to the greatest compression, or even throughout the whole length of the conduit. This lack of uniformity in the density of the filler is a source of imperfect cigarettes particularly when severance of the rod occurs at the thin parts or spaces, and results in an unnecessary percentage of rejected cigarettes.

It is an object of the present invention to provide an improved method of and means for folding the filler in the wrapper whereby the above objections are minimised or obviated.

To this end an aim of the invention is to provide means whereby the filler during its passage through the compression conduit or throat is subject to a positive feed so that at no time, and especially at that part of the compression conduit where the compression is greatest, is the filler in contact with a stationary part.

A further aim of the invention is to provide means whereby the wrapper, during its passage through the conduit or throat, is gradually folded over the filler whereby at or in the neighborhood of the egress where the compression is greatest, the wrapper is in a position such that the filler is enveloped as it were within a moving element or wall.

According to a feature of the invention means are provided associated with the tapered compression throat of the enfolding mechanism of a cigarette rod making machine adapted to preclude the setting up of a frictional retarding action upon the tobacco filler during its passage through the compression throat.

According to one feature the invention comprises a compression throat having a wall formed by a travelling band which is adapted to engage the upper part of the filler whereby a positive feed is imparted thereto in addition to the feed produced upon the main body of the filler by the usual conveyor band which supports the cigarette paper web or wrapper.

According to another feature of the invention during the travel through the compression throat, whether such be provided with an upper travelling band or a stationary element, the edges of the wrapper are gradually brought together into abutting relation after which one edge is adapted to be moved into a paste receiving position.

In the accompanying diagrammatic drawings
Figure 1 is an elevation of a wrapping and rod forming mechanism according to the invention.

Figure 2 is a corresponding plan, certain parts being removed for clearness.

Figures 3 to 14 are cross sections taken at the correspondingly marked sections on Figures 1 and 2.

Figure 15 is a diagrammatic plan of the section of the wrapping mechanism associated with the pasting of the wrapper.

Fig. 20 is a cross-section on the line XX of Figs. 1 and 2.

Fig. 21 is a similar view of a modified form of compression throat wherein the tapered slot is wide enough to permit the traveling band to engage and fold inwardly the edges of the tape and paper web.

Fig. 22 is a perspective view of a modified form of compression throat equipped with a stationary tongue whereby the tobacco filler is compressed and the margins of the cigarette paper are folded into abutting relation as it emerges from the compression throat.

Figure 3:
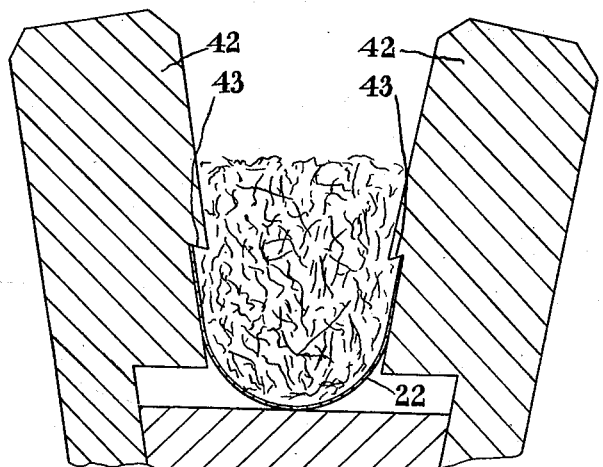
Figure 4:
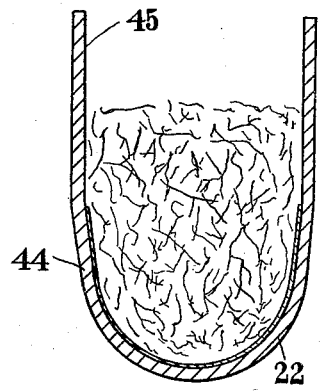
Figure 5:
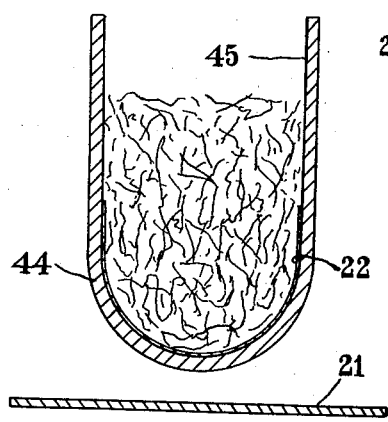
Figure 7:
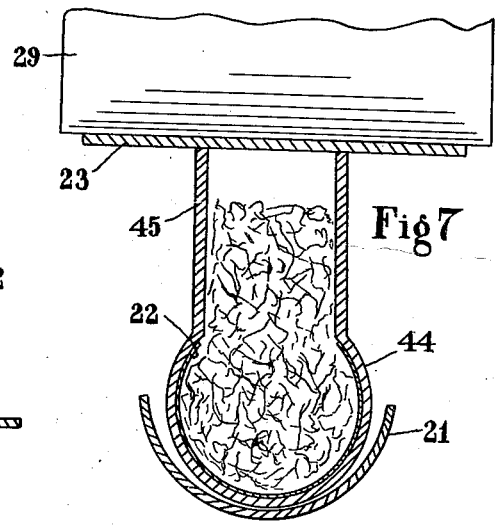
Figure 6:
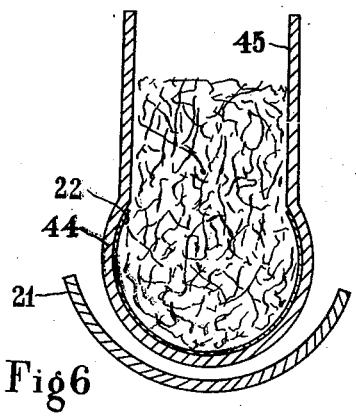

It will be appreciated that the sections are of a more or less diagrammatic nature and that certain parts are increased in thickness for clearness, while for convenience, certain spaces are indicated, which in practice are non-existent.

In carrying the invention into effect according to one convenient mode by way of example, the compression throat of an enfolding mechanism for continuous cigarette rod machines which extends between the section lines IX and X is formed of a lower stationary part 20 in which the usual feeding belt 21 for the cigarette paper web 22 travels, and an upper travelling part constituted by an endless belt or band 23 extending longitudinally of the lower part.

The lower stationary part or throat 20 may be formed in two pieces by a vertical division, such pieces being adjustable relatively to one another. The lower part is provided with a longitudinally extending tapered groove 24 which receives the feed belt 21, the groove at the entrance as shown by the section Figure 9 being of such dimensions and the upper terminal edges 25, 26 of the groove being spaced apart so that the feed belt and paper web are formed into a trough for the filler, the edges of the paper web extending above the edges of the belt.

Figure 10:
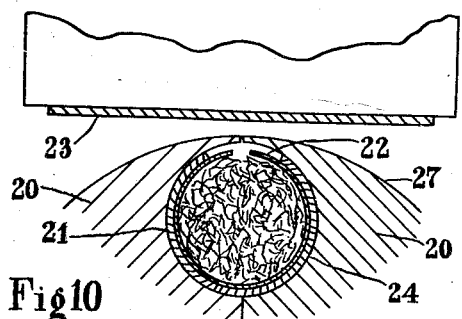

As the throat tapers the edges 25, 26 approach one another until they finally meet at the end of the throat in the section X, X where the groove is of substantially circular form, see Figure 10.

At the entrance to the throat the upper travelling band 23 may be arched in cross section so that it will close the tapering slot between the edges 25, 26 and engage the upper layer of the tobacco filler with a view to exerting a pressure thereon as the throat becomes smaller in cross section. The band 23 may also engage the edges of the web 22 to cause them to fold inwardly toward one another. The groove in the lower part is gradually reduced in dimension and the cross sectional shape gradually altered and brought nearer to a circular shape, the upper extremities of the groove approaching one another.

The arched curvature of the band 23 conforms to the outer surface 27 of the throat whereby an efficient closing of the tapered slot is obtained. The band may gradually flatten until finally it is of approximately flat cross section at a point where the cross sectional shape of the throat is such that the edges of the paper web are in abutting relation or nearly so (see Figure 10). At this point the upper travelling band leaves the throat as it will be appreciated that the tobacco is now enclosed in the paper web 22 and thus the positive feeding action of the upper travelling band is no longer required. The upper band 23 comprises an endless band of canvas or other suitable material which passes around a driving drum 28, guide pulleys 29 and a tensioning pulley 30. The pulley 30 is mounted on a pivoted lever 31 having a spring 32 whereby the band is kept in a taut condition. The operative run of the band 23 between the guide pulleys 29 is troughed to agree with the outer surface 27 of the throat by an adjustable block 33 which is provided with a groove 34 to accommodate the band.

The band 23 may be driven at the same rate as the feed belt 21, i. e. at the speed of travel of the paper web, or it may travel at a higher speed.

It will be appreciated that instead of arching the band 23, it may be of flat form where it closes the tapering slot in the throat.

The progressive reduction in the cross section caused by the groove in the throat continues as the enclosed filler and the web pass a plate 35 associated with a paste applying wheel 36. This compressive action of the plate 35 causes an overlapping of the marginal edges of the paper web.

Figure 11:
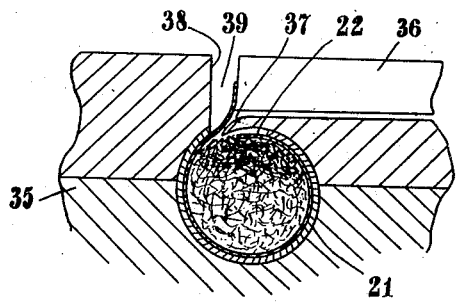
Figure 16:
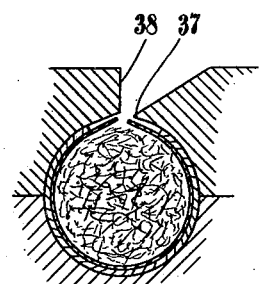
Figures 16 to 19 are sections taken at the correspondingly marked section in Figure 15.
Figure 12:
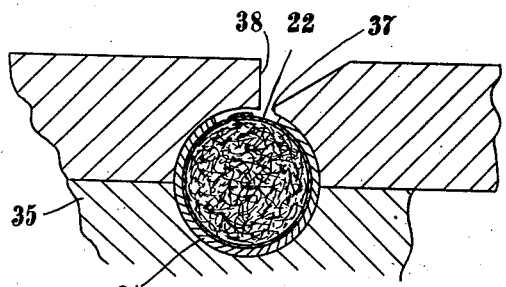
Figure 17:
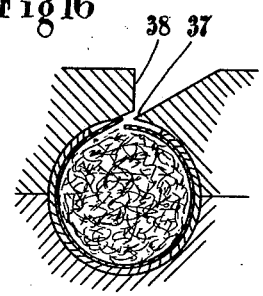
Figure 13:
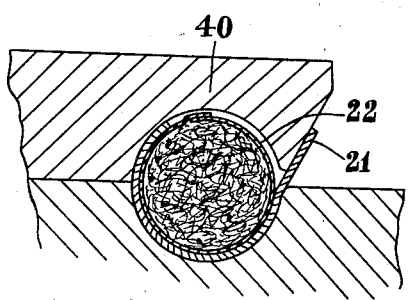
Figure 18:
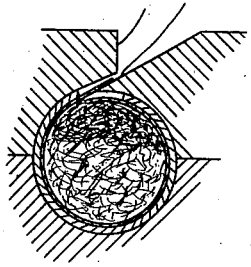
Figure 14:
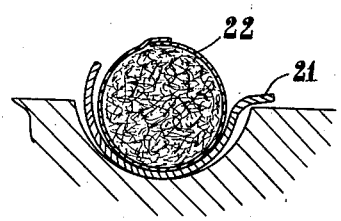
Figure 19:
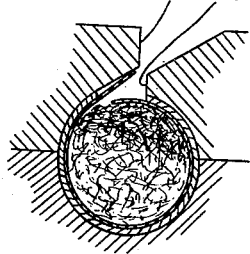

The plate 35 is formed in three parts, the upper parts having edges 37, 38 forming a slot 39 through which one margin of the paper web is adapted to be projected into a paste receiving position. As will be seen from the sections Figures 16, 17, 18 and 11, the edge 37 is gradually lowered and extends across the axis of the groove so as to provide a temporary super compression of the filler which results in a lateral displacement of the feeding belt 21 and the paper web 22 so that the paste receiving margin of the paper is caused to project through the slot 39 (see Figure 11), the edge 38 being also laterally displaced at this point to permit this taking place. From this section (XI, XI) an expansion takes place and the edges 37, 38 are again displaced laterally so that the edge 38 arrives at a position (XII, XII) in which it has brought down the pasted margin on to the other margin, at which point the wrapped filler is of the final cross section.

The plate 35 is followed by a sealing plate 40 which is formed in two parts, the upper of which extends over the enclosed filler or rod and applies a sealing pressure accompanied, if necessary, by heat. At the termination of the sealing plate 40 the feeding belt 21 opens out and the formed rod proceeds to the cut off.

The cross sections shown in Figures 3 to 8 indicate the treatment of the loaded paper web prior to its introduction into the compression throat.

The paper web 22 as it travels through the tobacco feeding apparatus 41 is troughed as seen in Figure 3. The edges of the paper web are covered by undercutting the walls 42 of the chute as at 43.

Between the tobacco feed 41 and the compression throat a channel member 44 is provided which supports the loaded web. The channel member 44 is gradually altered in shape so as to cause a rounding of the paper web with a partial envelopment of the filler, the height of the walls 45 are also reduced from the position of section VII—VII where the upper travelling belt 23 engages the walls (see Figure 7).

From position VII, VII the belt 23 will thus cause a compressive action upon the filler.

As will be seen from Figures 4 to 8 the channel member 44 at its lower part is gradually reduced in cross section and such part is also brought to a circular shape conforming to the entry into the compression throat. At the same time the upper side walls of the channel are brought closer together and reduced in height until they terminate at the entry into the throat. The drawing together of the walls 45 it will be noted agrees or approximates with the bringing together of the marginal edges of the paper web so that the troughed web retains a shape and condition adapted to receive the filler located between the walls 45 as such is pressed downwardly by the upper compression wall or belt 23.

The feed belt 21 runs beneath the channel 44 which is reduced in thickness as indicated in Figure 8 to accommodate the belt where it approaches the compression throat.

While it is preferred to bring the margins of the paper web into substantially abutting relation as indicated in Figure 10, it will be obvious that they may overlap somewhat at this position of the throat.

According to a modified arrangement shown in Fig. 22 the upper travelling band 23 may be replaced by a stationary tongue piece 130 conforming to the shape of the lower operative run of the band and provided with a portion 131 projecting over the upper side walls 145 of the channel member 144 through which the paper web carrying the filler tobacco travels into the compression throat 120 wherein it is advanced by the feed belt 121, whereby the filler is subjected to a compressing action and the edges of the wrapper 22 are folded over the filler ultimately abutting or occupying a position in which the filler is enveloped so that the filler, as it passes through the zone of greatest compression adjacent the point of egress from the throat is enclosed within a moving wall formed by the wrapper.

The travelling band 23 may be of any suitable material and may have a smooth or rough surface.

The improved apparatus may be modified to suit cigarettes of oval, diamond, square or other section and may also be modified to suit cigarettes in which the margins of the wrapper are crimped instead of pasted.

I claim:

1. Mechanism for forming the filler in the manufacture of a continuous cigarette rod, including a compression throat wherein the edges of the wrapper of the rod during passage through the throat are gradually brought into abutting relation so that the filler at or near the point of egress from the throat is enveloped within a surrounding traveling surface, said throat comprising a tapered conduit having an upper slot through which one margin of the wrapper is adapted to be projected into paste receiving position, said slot adjacent the paste receiving position being located to one side of the axis of the conduit, one wall of said conduit being extended over the filler and inclined downwardly to provide a compression of the filler which causes projection of the margin into pasting position.

2. In a cigarette rod former for continuous rod cigarette machines, a compression throat having a channel of circular cross-section adjacent its outlet end open at the top, a traveling band overlying and engaging the upper part of the filler to positively feed the same, said opening in the compression throat comprising a tapered slot which is closed by said band.

3. In a cigarette rod former for continuous rod cigarette machines, a compression throat open at the top, a traveling band overlying and engaging the upper part of the filler to positively feed the same, said opening in the compression throat comprising a tapered slot which is closed by said band, and a U-shaped channel element preceding said compression throat in the direction of travel of the filler, the walls of said channel element extending into engagement with said traveling band and decreasing in height in the direction of travel of the filler, whereby the filler is subject to compression by the traveling band.

4. In a cigarette rod former, a compression throat for compressing a traveling filler within a web, said throat tapering in the direction of movement of said filler to compress the same and cause said web to substantially surround the filler with both margins of the web within said throat, said throat thereafter being enlarged in the direction of movement of the filler and having a slot in its upper wall, one wall adjacent paste applying position overlying one margin of the wrapper within said throat, and another wall portion of said throat being arranged to apply pressure to the filler to cause said margin of the wrapper to project through the slot and means for pasting the projecting margin.

5. In a cigarette rod former for continuous rod cigarette machines, the combination with a traveling paper web for carrying the tobacco filler, of a compression throat tapering from the entrance end to narrower and nearly closed circular cross-section, arranged to act on said paper to compress the filler and cause the paper substantially to encircle completely the same, members for thereafter causing spreading of the margins of the paper, and a device for applying adhesive to the inner face of one of the paper margins so spread apart.

6. In a cigarette rod former for continuous rod cigarette machines, the combination with a traveling paper web for carrying the tobacco filler, of a compression throat tapering from a U-cross-section at the entrance end to a narrower and nearly closed circular cross-section, arranged to act on said paper to compress the filler and cause the paper substantially to encircle completely the same, and a traveling member having an operating surface traveling with said filler overlying and engaging the top surface only of said filler at the open side of said throat to aid in compressing and forwarding the same.

7. A cigarette rod former for continuous rod cigarette machines comprising in combination a traveling paper web for supporting the tobacco filler, a tapered compression throat of circular cross-section coacting with said web to cause same to encircle and compress said filler, said throat having an open slot at its upper side and having progressively decreased diameter in the direction of web travel to a point where the edges of the paper web substantially completely surround the filler, and means for diverting one edge of the web from the other into pasting position, and a paster wheel acting on said diverted edge.

8. In a cigarette rod former for a continuous rod cigarette machine, the combination with an enfolding mechanism comprising a traveling feeding tape for advancing a paper web supporting filler tobacco, a compression throat formed with a lower stationary part in which travels the feeding tape to advance therethrough the paper web supporting the filler tobacco, said lower part being adapted to cause said tape and paper web to encircle and compress said filler, of an upper traveling part constituted by an endless band extending longitudinally of the lower part, and means for guiding said upper band whereby as it travels it is adapted to engage the edges of the paper web to cause them to fold inwardly towards one another.

9. A cigarette rod former for continuous rod cigarette machines comprising in combination a traveling tape for supporting a paper web loaded with tobacco filler, a tapered compression throat of circular cross-section coacting with said tape and web to cause enfoldment and compression of the filler in said web, said throat having an open slot at its upper side and progressively decreased diameter in the direction of tape travel to a point where the edges of the paper web substantially surround the filler, means for diverting one edge of the closed paper web into pasting position, and a stationary tongue extending along said slot and engaging the top of the filler tobacco to compress the same.

10. In a cigarette rod former for continuous rod cigarette machines, the combination with a traveling web for supporting the tobacco filler, of a compression throat coacting with said web to compress said filler, and a traveling band overlying the filler and traveling in engagement with a substantial extent of the upper part thereof, at a speed substantially greater than that of the web.

ARTHUR PODMORE.